United States Patent
Berjot et al.

(10) Patent No.: US 12,404,032 B2
(45) Date of Patent: Sep. 2, 2025

(54) AIRCRAFT COMPRISING AT LEAST ONE ENGINE ATTACHMENT SYSTEM THAT HAS REDUCED VERTICAL BULK

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/905,523

(22) Filed: Oct. 3, 2024

(65) Prior Publication Data
US 2025/0115365 A1    Apr. 10, 2025

(51) Int. Cl.
*B64D 27/40* (2024.01)

(52) U.S. Cl.
CPC .................................. *B64D 27/404* (2024.01)

(58) Field of Classification Search
CPC . B64D 27/404; B64D 2027/268; B64D 27/26
See application file for complete search history.

(56) References Cited

U.S. PATENT DOCUMENTS

| | | | |
|---|---|---|---|
| 2019/0135445 A1 | 5/2019 | Combes et al. | |
| 2020/0298986 A1* | 9/2020 | Cayssials | B64D 27/404 |
| 2020/0331619 A1* | 10/2020 | Berjot | B64D 27/40 |

FOREIGN PATENT DOCUMENTS

| | | |
|---|---|---|
| FR | 3073204 A1 | 5/2019 |
| FR | 3095192 A1 | 1/2020 |

OTHER PUBLICATIONS

French Search Report for corresponding French Patent Application No. 2310696 dated Apr. 15, 2024.

* cited by examiner

*Primary Examiner* — Alentina Xavier
(74) *Attorney, Agent, or Firm* — Greer, Burns & Crain, Ltd.

(57) ABSTRACT

An aircraft comprising at least one engine attachment system connecting a primary structure of a pylon and a motor, having a right-hand interface connected to the right-hand lateral face of the primary structure, a left-hand interface connected to the left-hand lateral face of the primary structure, first and second shackles connecting the right-hand and left-hand interfaces to the motor by virtue of engine connection pins and interface connection pins, a right-hand emergency connection pin cooperating with the right-hand interface and the motor, and a left-hand emergency connection pin cooperating with the left-hand interface and the motor.

10 Claims, 8 Drawing Sheets

AIRCRAFT COMPRISING AT LEAST ONE ENGINE ATTACHMENT SYSTEM THAT HAS REDUCED VERTICAL BULK

CROSS-REFERENCES TO RELATED APPLICATIONS

This application claims the benefit of French Patent Application Number 2310696 filed on Oct. 6, 2023, the entire disclosures of which are incorporated herein by way of reference.

FIELD OF THE INVENTION

The present application relates to an aircraft comprising at least one engine attachment system that has reduced vertical bulk.

BACKGROUND OF THE INVENTION

Figure 1:
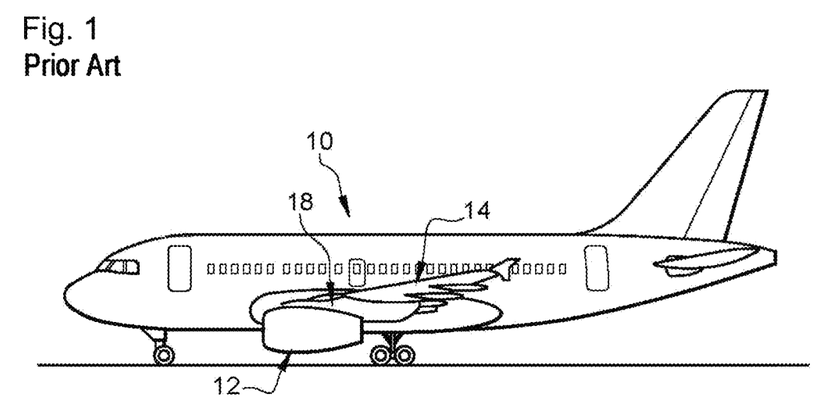
FIG. 1 is a side view of an aircraft.
Figure 2:
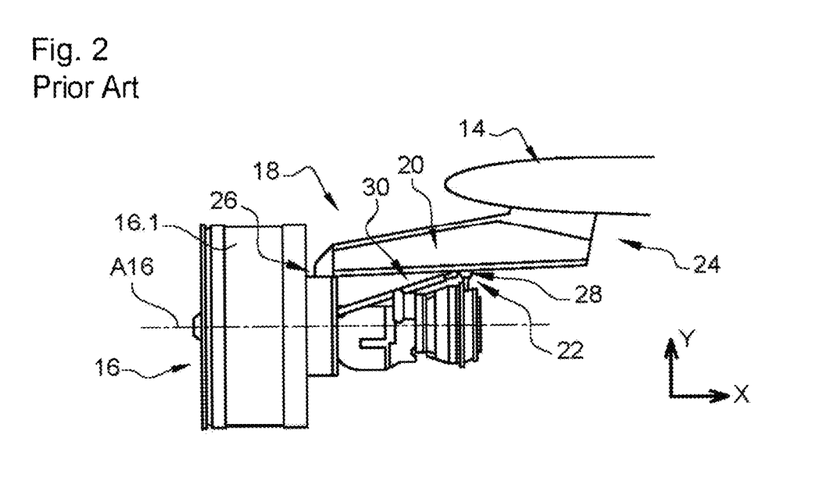
FIG. 2 is a side view of a motor.

According to an embodiment visible in FIGS. 1 and 2, an aircraft 10 comprises a plurality of propulsion assemblies 12 positioned beneath each of the wings 14 of the aircraft. Each propulsion assembly 12 comprises a motor 16, a nacelle (not shown in FIG. 2) positioned around the motor 16, and a pylon 18 connecting the motor 16 and the wing 14. The pylon 18 comprises a primary structure 20 that is connected to the motor 16 by an engine attachment system 22 and to the wing 14 by a wing attachment system 24.

For the present invention, a longitudinal direction X is substantially parallel to the axis of rotation A16 of the motor 16. A vertical median plane PMV is a vertical plane passing through the axis of rotation A16. A transverse plane is a plane perpendicular to the axis of rotation A16. A horizontal transverse direction Y is a horizontal direction perpendicular to the axis of rotation A16. A vertical direction is denoted Z in the various figures. The terms front/rear refer to the direction of flow of the airflows that flow in the longitudinal direction X, from the front toward the rear.

The engine attachment system 22 comprises a front engine attachment system 26, a rear engine attachment system 28 and a pair of thrust rods 30 that react the thrust forces.

Figure 3:
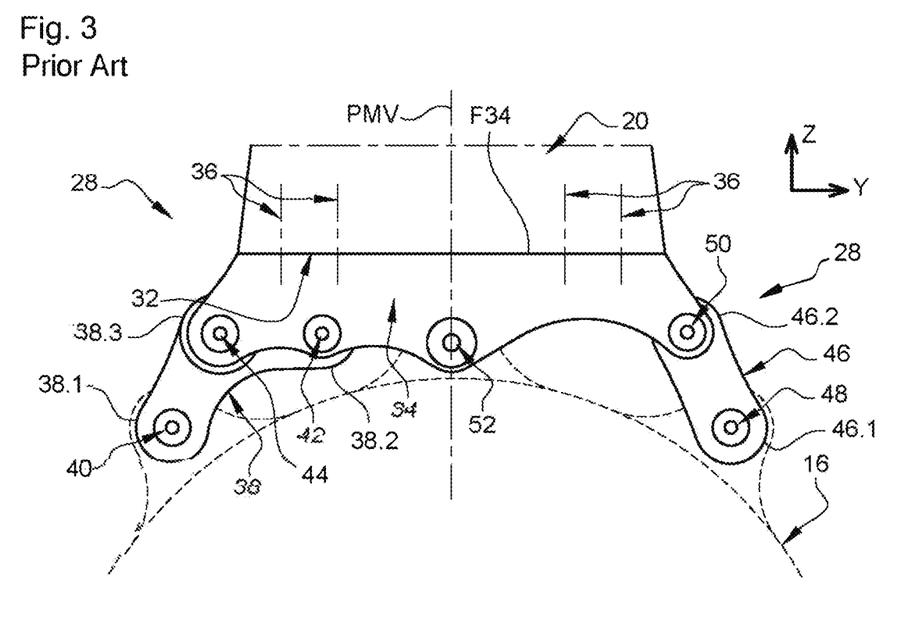
FIG. 3 is a front view of an engine attachment system, which illustrates an embodiment of the prior art.
Figure 4:
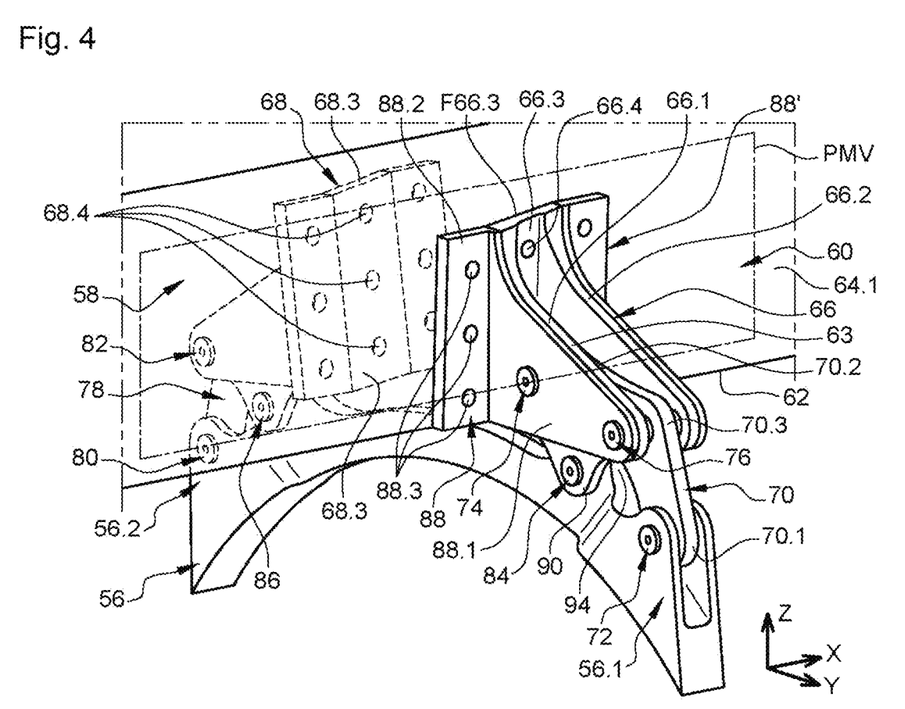
FIG. 4 is a perspective view of an engine attachment system, which illustrates an embodiment of the invention.

According to an embodiment visible in FIG. 3, for the rear engine attachment system 28, the primary structure 20 comprises a sole 32 positioned approximately in a horizontal plane.

In addition, the rear engine attachment system 28 comprises a transverse beam 34 that has a bearing face F34 pressed against the sole 32, the transverse beam 34 being connected to the primary structure 20 by connection elements 36.

The rear engine attachment system 28 comprises:
a first, L-shaped shackle 38, which has a first end 38.1, a second end 38.2 and an intermediate zone 38.3,
  a first engine connection pin 40 connecting the first end 38.1 of the first shackle 38 and the motor 16,
  a first beam connection pin 42 connecting the second end 38.2 of the first shackle 38 and the transverse beam 34,
  a second beam connection pin 44 connecting the intermediate zone 38.3 of the first shackle 38 and the transverse beam 34;
a second shackle 46, which has first and second ends 46.1, 46.2,
  a second engine connection pin 48 connecting the first end 46.1 of the second shackle 46 and the motor 16,
  a third beam connection pin 50 connecting the second end 46.2 of the second shackle 46 and the transverse beam 34;
  an emergency connection pin 52, directly connecting the transverse beam 34 and the motor 16 in the event of a failure, positioned at the vertical median plane PMV.

The connection pins 40, 42, 44, 48, 50, 52 are substantially parallel to each other and to the longitudinal direction X.

According to the embodiment visible in FIG. 3, the transverse beam 34 is necessarily positioned beneath the primary structure 20 of the pylon 18. This arrangement leads to significant bulk in the vertical direction, and this tends to limit the diameter of the motor 16 and more particularly of its fan casing 16.1.

The present invention aims to remedy all or some of the drawbacks of the prior art.

SUMMARY OF THE INVENTION

To this end, the invention relates to an aircraft comprising at least one motor, at least one primary structure of a pylon and at least one engine attachment system connecting the primary structure and the motor, the primary structure having a lower face and right-hand and left-hand lateral faces positioned on either side of a vertical median plane, the engine attachment system having:
  at least one first, L-shaped shackle, positioned in a transverse plane, which has first and second ends and an intermediate zone,
  a first engine connection pin connecting the first end of the first shackle and the motor,
  at least one second shackle, positioned in a transverse plane, which has first and second ends,
  a second engine connection pin connecting the first end of the second shackle and the motor.

According to the invention, the engine attachment system comprises:
  a right-hand interface connected to the right-hand lateral face of the primary structure,
  a left-hand interface connected to the left-hand lateral face of the primary structure,
  a first interface connection pin connecting the second end of the first shackle and a first interface among the right-hand and left-hand interfaces,
  a second interface connection pin connecting the intermediate zone of the first shackle and the first interface,
  a third interface connection pin connecting the second end of the second shackle and a second interface, which is different from the first interface, among the right-hand and left-hand interfaces,
  a right-hand emergency connection pin cooperating with the right-hand interface and the motor,
  a left-hand emergency connection pin cooperating with the left-hand interface and the motor.

According to this arrangement, since the right-hand and left-hand interfaces are not positioned beneath the primary structure but on the lateral faces thereof, the engine attachment system is relatively compact in the vertical direction, and this makes it possible to install motors of larger diameters.

According to another feature, the first, second and third interface connection pins are situated at a lower plane passing through the lower face of the primary structure or offset upward with respect to this lower plane.

According to another feature, the first interface among the right-hand and left-hand interfaces comprises, for each of the first and second interface connection pins, at least one through-orifice housing the first or second interface connection pin and dimensioned such that the first or second interface connection pin is immobile in translation, in a transverse plane, with respect to the first interface. In parallel, the second interface among the right-hand and left-hand interfaces comprises at least one through-orifice housing the third interface connection pin and dimensioned such that the third interface connection pin is immobile in translation, in a transverse plane, with respect to the second interface.

According to another feature, each right-hand or left-hand interface comprises front and rear arms positioned in transverse planes, parallel to each other and slightly spaced apart, and a right-hand or left-hand base connecting the front and rear arms, the right-hand or left-hand base being connected to the primary structure by at least one connection element.

According to another feature, the engine attachment system comprises at least one reinforcing bracket having a first wall pressed against one of the front and rear arms of the right-hand and left-hand interfaces and a second wall pressed against the right-hand or left-hand lateral face of the primary structure and connected to the primary structure by at least one connection element; the first wall having, for each of the first, second and third interface connection pins passing through it, a through-orifice dimensioned such that the first, second or third interface connection pin is immobile in translation, in a transverse plane, with respect to the first wall.

According to another feature, for each right-hand and left-hand interface, the engine attachment system comprises a front reinforcing bracket, positioned at the front of the right-hand or left-hand interface, having a first wall pressed against the front arm of the right-hand or left-hand interface and a second wall pressed against the right-hand or left-hand lateral face of the primary structure and a rear reinforcing bracket, positioned at the rear of the right-hand or left-hand interface, having a first wall pressed against the rear arm of the right-hand or left-hand interface and a second wall pressed against the right-hand or left-hand lateral face of the primary structure.

According to another feature, each front and rear arm of each right-hand and left-hand interface comprises a side oriented toward the motor and an extension positioned at the side and offset toward the motor with respect to the remainder of the side, the extension having a through-orifice that houses the right-hand or left-hand emergency connection pin.

According to another feature, the motor comprises, for each right-hand or left-hand emergency connection pin, a transverse flange positioned at least partially between the front and rear arms of the corresponding right-hand or left-hand interface, the transverse flange having a through-orifice that houses the right-hand or left-hand emergency connection pin.

According to another feature, the motor comprises, for the first engine connection pin, a first clevis that has two arms between which the first shackle is positioned and, for the second engine connection pin, a second clevis that has two arms between which the second shackle is positioned.

According to another feature, the engine attachment system comprises, for each right-hand or left-hand emergency connection pin, a clearance between the right-hand or left-hand emergency connection pin and one element among the motor and the right-hand or left-hand interface.

According to another feature, the motor comprises, for each of the first and second engine connection pins, at least one through-orifice, which houses the first or second engine connection pin, dimensioned such that each of the first and second engine connection pins is immobile in translation, in a transverse plane, with respect to the motor.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

An aircraft comprises at least one motor 56, at least one primary structure 58 of a pylon, and at least one engine attachment system 60 connecting the motor 56 and the primary structure 58. According to one arrangement, this engine attachment system 60, referred to as rear engine attachment system, is moved away from the fan casing of the motor 56.

The motor 56 has a vertical median plane PMV and a substantially cylindrical casing in line with the engine attachment system 60.

According to an embodiment visible in FIGS. 4 to 8C, the primary structure 58 comprises a lower face 62 substantially perpendicular to the vertical median plane PMV, and right-hand and left-hand lateral faces 64.1, 64.2 positioned on either side of the vertical median plane PMV and above the lower face 62. According to one configuration, each right-hand or left-hand lateral face 64.1, 64.2 forms, in a transverse plane, an angle of between 0 and 20° with the vertical median plane PMV, the right-hand and left-hand lateral faces 64.1, 64.2 being flared upward.

The engine attachment system 60 comprises:
- a right-hand interface 66 connected to the right-hand lateral face 64.1 of the primary structure 58,
- a left-hand interface 68 connected to the left-hand lateral face 64.2 of the primary structure 58,
- at least one first, L-shaped shackle 70, positioned in a transverse plane, which has a first end 70.1, a second end 70.2 and an intermediate zone 70.3 situated at the bent zone of the first, L-shaped shackle 70,
- a first engine connection pin 72 connecting the first end 70.1 of the first shackle 70 and the motor 56,
- a first interface connection pin 74 connecting the second end 70.2 of the first shackle 70 and a first interface among the right-hand and left-hand interfaces 66, 68, a second interface connection pin 76 connecting the intermediate zone 70.3 of the first shackle 70 and the first interface;

at least one second shackle 78, positioned in a transverse plane, which has first and second ends 78.1, 78.2, a second engine connection pin 80 connecting the first end 78.1 of the second shackle 78 and the motor 56, a third interface connection pin 82 connecting the second end 78.2 of the second shackle 78 and a second interface among the right-hand and left-hand interfaces 66, 68;

a right-hand emergency connection pin 84 cooperating with the right-hand interface 66 and the motor 56, a left-hand emergency connection pin 86 cooperating with the left-hand interface 68 and the motor 56.

The engine connection, interface connection and emergency connection pins are parallel to each other and to the longitudinal direction X.

According to this arrangement, the right-hand and left-hand interfaces 66, 68 are two distinct and dissociated elements. Since these right-hand and left-hand interfaces 66, 68 are not positioned beneath the primary structure 58 but on the lateral faces thereof, the engine attachment system 60 is relatively compact in the vertical direction, and this makes it possible to install motors 56 of larger diameters.

According to one configuration, the interface connection pins 74, 76, 82 are situated at a lower plane passing through the lower face 62 of the primary structure 58 or offset upward with respect to this lower plane. This arrangement makes it possible to further reduce the vertical bulk.

According to one embodiment, the first interface connection pin 74 connected to the second end 70.2 of the first, L-shaped shackle 70 is positioned between the primary structure 58 and the second interface connection pin 76 connected to the intermediate zone 70.3 of the first shackle 70.

According to one arrangement, each first, L-shaped shackle 70 is connected to the right-hand interface 66 and each second shackle 78 is connected to the left-hand interface 68. In a variant, each first, L-shaped shackle 70 could be connected to the left-hand interface 68 and each second shackle 78 could be connected to the right-hand interface 66.

Each first or second shackle 70, 78 comprises, for each engine connection pin 72, 80 and each interface connection pin 74, 76, 82, a through-orifice, which houses the engine connection pin 72, 80 or the interface connection pin 74, 76, 82, dimensioned such that each engine or interface connection pin 72, 74, 76, 80, 82 is immobile in translation, in a transverse plane, with respect to the first or second shackle 70, 78.

The first interface among the right-hand and left-hand interfaces 66, 68 comprises, for each of the first and second interface connection pins 74, 76, at least one through-orifice, which houses the first or second interface connection pin 74, 76, dimensioned such that the first or second interface connection pin 74, 76 is immobile in translation, in a transverse plane, with respect to the first interface. In addition, the second interface among the right-hand and left-hand interfaces 66, 68 comprises at least one through-orifice, which houses the third interface connection pin 82, dimensioned such that the third interface connection pin 82 is immobile in translation, in a transverse plane, with respect to the second interface. Thus, in normal operation, each interface connection pin 74, 76, 82 is configured to transmit the forces, at least in a transverse plane, between the right-hand and left-hand interfaces 66, 68 and the first and second shackles 70, 78.

The motor 56 comprises, for each engine connection pin 72, 80, at least one through-orifice, which houses the engine connection pin 72, 80, dimensioned such that each engine connection pin 72, 80 is immobile in translation, in a transverse plane, with respect to the motor 56. Thus, in normal operation, each engine connection pin 72, 80 is configured to transmit the forces, at least in a transverse plane, between the motor 56 and the corresponding first or second shackle 70, 78.

The right-hand interface 66 comprises at least one right-hand arm 66.1 positioned in a transverse plane and passed through by at least one of the first, second and third interface connection pins 74, 76, 82. The left-hand interface 68 comprises at least one left-hand arm 68.1 positioned in a transverse plane and passed through by at least one of the first, second and third interface connection pins 74, 76, 82.

According to one configuration, the right-hand interface 66 comprises front and rear right-hand arms 66.1, 66.2 positioned in transverse planes, parallel to each other and slightly spaced apart, and a right-hand base 66.3 connecting the front and rear right-hand arms 66.1, 66.2, the right-hand base 66.3 having a contact face F66.3 pressed against the right-hand lateral face 64.1 of the primary structure 58 and being connected to the primary structure 58 by at least one connection element 66.4, generally a plurality of connection elements 66.4 distributed in the vertical direction.

The left-hand interface 68 comprises front and rear left-hand arms 68.1, 68.2 positioned in transverse planes, parallel to each other and slightly spaced apart, and a left-hand base 68.3 connecting the front and rear left-hand arms 68.1, 68.2, the left-hand base 68.3 having a contact face F68.3 pressed against the left-hand lateral face 64.2 of the primary structure 58 and being connected to the primary structure 58 by at least one connection element 68.4, generally a plurality of connection elements 68.4 distributed in the vertical direction.

In addition, the engine attachment system 60 comprises a single first shackle 70, interposed between the front and rear arms 66.1, 66.2, 68.1, 68.2 of the right-hand or left-hand interface 66, 68, and a single second shackle 78 interposed between the front and rear arms 66.1, 66.2, 68.1, 68.2 of the right-hand or left-hand interface 66, 68.

Finally, the motor 56 comprises, for the first engine connection pin 72, a first clevis 56.1 that has two arms between which the first shackle 70 is positioned and, for the second engine connection pin 80, a second clevis 56.2 that has two arms between which the second shackle 78 is positioned.

According to another configuration, each right-hand and left-hand interface 66, 68 comprises a single right-hand or left-hand arm 66.1, 68.1. In addition, the engine attachment system 60 comprises two first shackles 70 positioned on either side of a first arm among the right-hand and left-hand arms and two second shackles 78 positioned on either side of a second arm, which is different from the first arm, among the right-hand and left-hand arms.

Whatever the configuration, each right-hand or left-hand interface 66, 68 has a contact face 66.3, 68.3, pressed against the right-hand or left-hand lateral face 64.1, 64.2, which does not extend against the lower face 62 and therefore beyond the right-hand or left-hand lateral face 64.1, 64.2.

According to one embodiment, each right-hand or left-hand arm 66.1, 66.2, 68.1, 68.2 has a substantially triangular contour having a first side C1, pressed against the primary structure 58, which extends from the lower face 62 of the primary structure 58, a second side C2 positioned approximately in the continuation of the lower face 62 of the primary structure 58 and approximately in a horizontal plane, and a third side C3, the second and third sides C2, C3 being connected by a rounded vertex at which is positioned the second interface connection pin 76 connected to the intermediate zone 70.3 of the first shackle 70 or the third interface connection pin 82 connected to the second end 78.2 of the second shackle 78. The front and rear arms 66.1, 66.2, 68.1, 68.2 of each right-hand or left-hand interface 66, 68 have the same contour. Whatever the embodiment, each right-hand or left-hand arm 66.1, 66.2, 68.1, 68.2 comprises a side oriented toward the motor 56.

According to one embodiment, the engine attachment system 60 comprises at least one reinforcing bracket 88 having a first wall 88.1 pressed against one of the right-hand or left-hand, front or rear arms 66.1, 66.2, 68.1, 68.2 and a second wall 88.2 pressed against the right-hand or left-hand lateral face 64.1, 64.2 and connected to the primary structure 58 by at least one connection element 88.3, generally a plurality of connection elements 88.3 distributed in the vertical direction. Each first wall 88.1 comprises, for each interface connection pin 74, 76, 82 that passes through it, a through-orifice, which houses the interface connection pin 74, 76, 82, dimensioned such that the interface connection pin 74, 76, 82 is immobile in translation, in a transverse plane, with respect to the first wall 88.1. Thus, in normal operation, each of the first, second and third interface connection pins 74, 76, 82 is configured to transmit the forces, at least in a transverse plane, between the first wall 88.1 of the reinforcing bracket 88 and the first or second shackle 70, 78 that are passed through by the first, second or third interface connection pin 74, 76, 82.

According to one configuration, the engine attachment system 60 comprises, for each front and rear arm 66.1, 66.2, 68.1, 68.2 of each right-hand and left-hand interface 66, 68, a reinforcing bracket 88, 88'. Thus, for each right-hand and left-hand interface 66, 68, the engine attachment system 60 comprises a front reinforcing bracket 88, positioned at the front of the right-hand or left-hand interface 66, 68, having a first wall 88.1 pressed against the front arm 66.1, 68.1 of the right-hand or left-hand interface 66, 68 and a second wall 88.2 pressed against the right-hand or left-hand lateral face 64.1, 64.2 of the primary structure 58, at the front of the right-hand or left-hand interface 66, 68, and a rear reinforcing bracket 88', positioned at the rear of the right-hand or left-hand interface 66, 68, having a first wall 88.1 pressed against the rear arm 66.2, 68.2 of the right-hand or left-hand interface 66, 68 and a second wall 88.2 pressed against the right-hand or left-hand lateral face 64.1, 64.2 of the primary structure 58, at the rear of the right-hand or left-hand interface 66, 68.

According to one embodiment, each arm 66.1, 66.2, 68.1, 68.2 of each right-hand and left-hand interface 66, 68 comprises an extension 90 positioned at its second side C2 oriented toward the motor 56 and offset toward the motor 56 with respect to the remainder of the second side C2, the extension 90 having a through-orifice 92 designed to house the right-hand or left-hand emergency connection pin 84, 86.

According to a first configuration, when the right-hand or left-hand interface 66, 68 comprises a single right-hand or left-hand arm 66.1, 68.1, the motor 56 comprises, for each right-hand or left-hand emergency connection pin 84, 86, a clevis that has two arms between which the extension 90 is at least partially positioned, each of the arms having a through-orifice designed to house the right-hand or left-hand emergency connection pin 84, 86.

According to a second configuration, when the right-hand or left-hand interface 66, 68 comprises front and rear arms 66.1, 66.2, 68.1, 68.2, the motor 56 comprises, for each right-hand or left-hand emergency connection pin 84, 86, a transverse flange 94 positioned at least partially between the front and rear arms 66.1, 66.2, 68.1, 68.2 of the corresponding right-hand or left-hand interface 66, 68, the transverse flange 94 having a through-orifice designed to house the right-hand or left-hand emergency connection pin 84, 86.

Whatever the configuration, the right-hand or left-hand emergency connection pin 84, 86 provides a direct connection between each right-hand or left-hand interface 66, 68 and the motor 56 in the event of a failure. The engine attachment system 60 comprises, for each right-hand or left-hand emergency connection pin 84, 86, a clearance between the right-hand or left-hand emergency connection pin 84, 86 and one element among the motor 56 and the right-hand or left-hand interface 66, 68. This clearance is calibrated to allow displacement in a transverse plane between the motor 56 and the right-hand or left-hand interface 66, 68 during operation.

According to a first arrangement, the right-hand or left-hand emergency connection pin 84, 86 is as one with the right-hand or left-hand interface 66, 68 and a clearance is provided between the right-hand or left-hand emergency connection pin 84, 86 and the motor 56.

According to a second arrangement, the right-hand or left-hand emergency connection pin 84, 86 is as one with the motor 56 and a clearance is provided between the right-hand or left-hand emergency connection pin 84, 86 and the right-hand or left-hand interface 66, 68. Thus, according to the second configuration, the right-hand or left-hand emergency connection pin 84, 86 is as one with the transverse flange 94 of the motor 56 and a clearance is provided between the right-hand or left-hand emergency connection pin 84, 86 and each front and rear arm 66.1, 66.2, 68.1, 68.2 of the corresponding right-hand or left-hand interface 66, 68.

Figure 5:
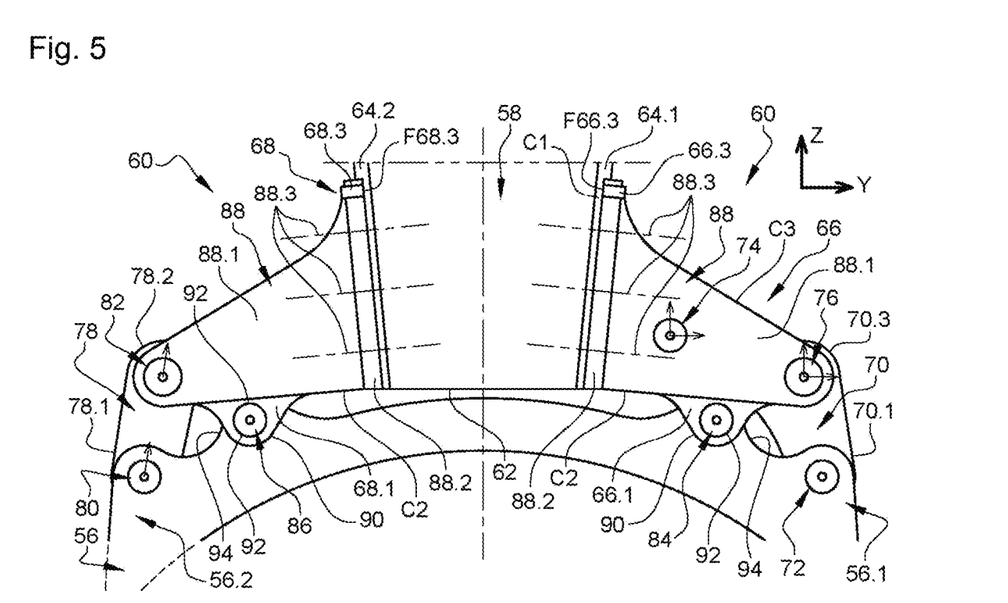
FIG. 5 is a front view of the engine attachment system visible in FIG. 4.
Figure 6:
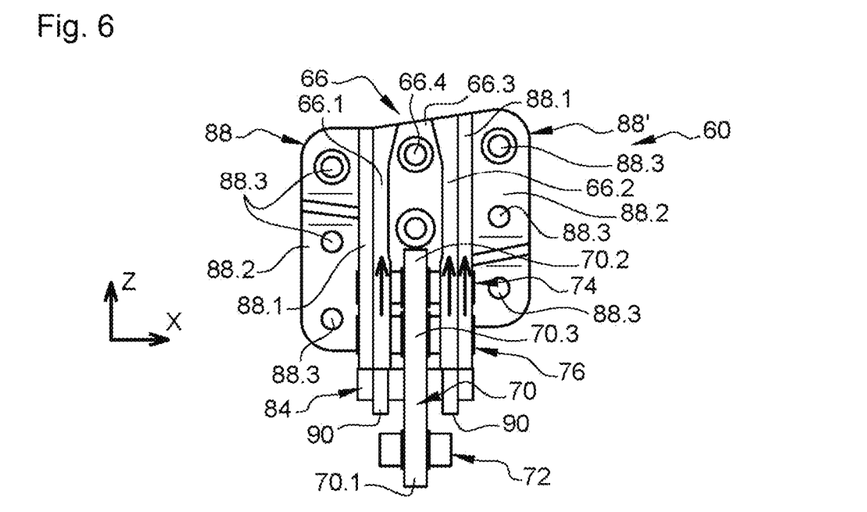
FIG. 6 is a side view of the engine attachment system visible in FIG. 4.

As illustrated in FIGS. 5 and 6, in normal operation, the first and second engine connection pins 72, 80 and the first, second and third interface connection pins 74, 76, 82 are configured to transmit the forces between the motor 56 and the right-hand and left-hand interfaces 66, 68 and optionally the reinforcing brackets 88, 88'. In addition, the connection elements 66.4, 68.4 and 88.3 connecting the right-hand and left-hand interfaces 66, 68 and the reinforcing brackets 88, 88' to the primary structure 58 are configured to transmit the forces between, on the one hand, the right-hand and left-hand interfaces 66, 68 and the reinforcing brackets 88, 88' and, on the other hand, the primary structure 58.

Figure 7:
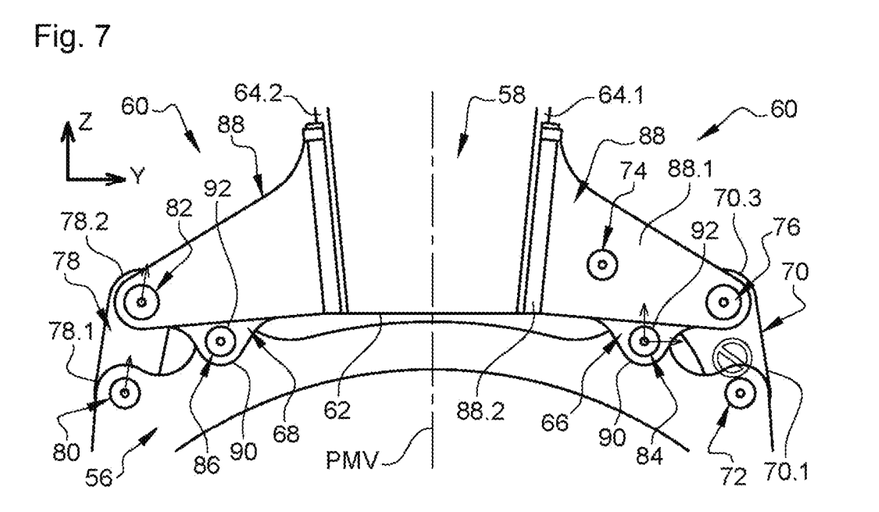
FIG. 7 is a front view of the engine attachment system visible in FIG. 4, illustrating a failure at one of the shackles.

As illustrated in FIG. 7, in the event of damage to a shackle 70, 78, the right-hand or left-hand emergency connection pin 84, 86, which is connected to the right-hand or left-hand interface 66, 68 to which the damaged shackle 70, 78 is connected, is configured to ensure, in addition to the undamaged shackle, the transmission of the forces between the motor 56 and the right-hand and left-hand interfaces 66, 68 and to compensate for this failure.

Figure 8A:
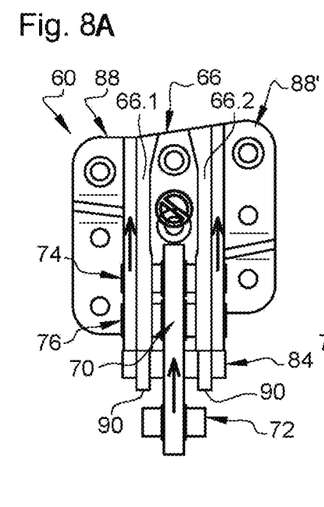
FIGS. 8A, 8B and 8C depict side views of the engine attachment system visible in FIG. 4, illustrating various failures.

As illustrated in FIG. 8A, in the event of failure of the right-hand or left-hand interface 66, 68, the front and rear reinforcing brackets 88, 88', which are positioned on either side of the damaged right-hand or left-hand interface 66, 68, are configured to compensate for this failure and to ensure at least partial transmission of the forces between the motor 56 and the primary structure 58.

Figure 8B:
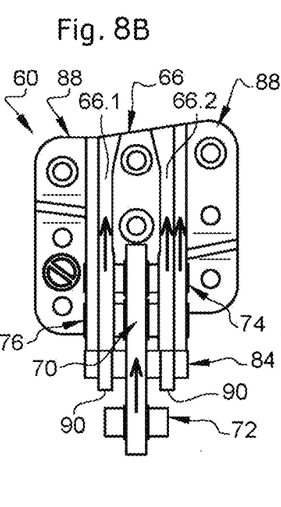

As illustrated in FIG. 8B, in the event of failure of the front reinforcing bracket 88, the right-hand or left-hand interface 66, 68 and the rear reinforcing bracket 88', which are positioned against the same right-hand or left-hand lateral face 64.1, 64.2 of the primary structure 58 as the damaged front reinforcing bracket 88, are configured to compensate for this failure and to ensure at least partial transmission of the forces between the motor 56 and the primary structure 58.

Figure 8C:
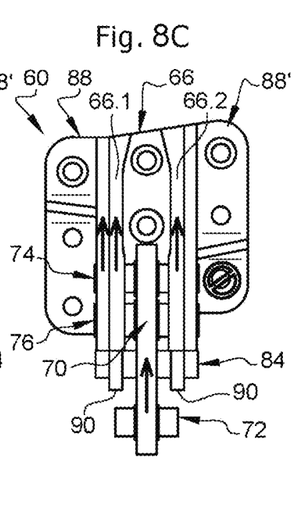

As illustrated in FIG. 8C, in the event of failure of the rear reinforcing bracket 88', the right-hand or left-hand interface 66, 68 and the front reinforcing bracket 88, which are positioned against the same right-hand or left-hand lateral face 64.1, 64.2 of the primary structure 58 as the damaged rear reinforcing bracket 88', are configured to compensate for this failure and to ensure at least partial transmission of the forces between the motor 56 and the primary structure 58.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a motor,
   a primary structure of a pylon and an engine attachment system connecting the primary structure and the motor, said primary structure having a lower face and right-hand and left-hand lateral faces positioned on either side of a vertical median plane (PMV),
   the engine attachment system comprising:
      an L-shaped shackle, positioned in a transverse plane, which has first and second ends and an intermediate zone,
      a first engine connection pin connecting the first end of the first shackle and the motor,
      a second shackle, positioned in a transverse plane, which has first and second ends,
      a second engine connection pin connecting the first end of the second shackle and the motor,
      a right-hand interface connected to the right-hand lateral face of the primary structure,
      a left-hand interface connected to the left-hand lateral face of the primary structure,
      a first interface connection pin connecting the second end of the first shackle and a first interface among the right-hand and left-hand interfaces,
      a second interface connection pin connecting the intermediate zone of the first shackle and the first interface,
      a third interface connection pin connecting the second end of the second shackle and a second interface, which is different from the first interface, among the right-hand and left-hand interfaces,
      a right-hand emergency connection pin cooperating with the right-hand interface and the motor,
   a left-hand emergency connection pin cooperating with the left-hand interface and the motor,
   wherein each right-hand or left-hand interface comprises front and rear arms positioned in transverse planes, parallel to each other and slightly spaced apart, and a right-hand or left-hand base connecting the front and rear arms, said right-hand or left-hand base being connected to the primary structure by a connection element.

2. The aircraft as claimed in claim 1, wherein the first, second and third interface connection pins are situated at a lower plane passing through the lower face of the primary structure or offset upward with respect to this lower plane.

3. The aircraft as claimed in claim 1,
   wherein the first interface among the right-hand and left-hand interfaces comprises, for each of the first and second interface connection pins, a through-orifice, which houses the first or second interface connection pin, dimensioned such that the first or second interface connection pin is immobile in translation, in a transverse plane, with respect to the first interface, and
   wherein the second interface among the right-hand and left-hand interfaces comprises a through-orifice, which houses the third interface connection pin, dimensioned such that the third interface connection pin is immobile in translation, in a transverse plane, with respect to the second interface.

4. The aircraft as claimed in claim 1, wherein the engine attachment system comprises a reinforcing bracket having a first wall pressed against one of the front and rear arms of the right-hand and left-hand interfaces and a second wall pressed against the right-hand or left-hand lateral face of the primary structure and connected to the primary structure by a connection element; the first wall having, for each of the first, second and third interface connection pins that passes through it, a through-orifice dimensioned such that the first, second or third interface connection pin is immobile in translation, in a transverse plane, with respect to the first wall.

5. The aircraft as claimed in claim 4, wherein, for each right-hand and left-hand interface, the engine attachment system comprises:
   a front reinforcing bracket, positioned at the front of the right-hand or left-hand interface, having a first wall pressed against the front arm of the right-hand or left-hand interface and a second wall pressed against the right-hand or left-hand lateral face of the primary structure, and
   a rear reinforcing bracket, positioned at the rear of the right-hand or left-hand interface, having a first wall pressed against the rear arm of the right-hand or left-hand interface and a second wall pressed against the right-hand or left-hand lateral face of the primary structure.

6. The aircraft as claimed in claim 1, wherein each front and rear arm of each right-hand and left-hand interface comprises a side oriented toward the motor and an extension positioned at said side and offset toward the motor with respect to a remainder of said side, said extension having a through-orifice that houses the right-hand or left-hand emergency connection pin.

7. The aircraft as claimed in claim 1, wherein the motor comprises, for each right-hand or left-hand emergency connection pin, a transverse flange positioned at least partially between the front and rear arms of the corresponding right-hand or left-hand interface, said transverse flange having a through-orifice that houses the right-hand or left-hand emergency connection pin.

8. The aircraft as claimed in claim 1, wherein the motor comprises, for the first engine connection pin, a first clevis that has two arms between which the first shackle is positioned and, for the second engine connection pin, a second clevis that has two arms between which the second shackle is positioned.

9. The aircraft as claimed in claim 1, wherein the engine attachment system comprises, for each right-hand or left-hand emergency connection pin, a clearance between the right-hand or left-hand emergency connection pin and one element among the motor and the right-hand or left-hand interface.

10. The aircraft as claimed in claim 1, wherein the motor comprises, for each of the first and second engine connection pins, a through-orifice, which houses the first or second engine connection pin, dimensioned such that each of the first and second engine connection pins is immobile in translation, in a transverse plane, with respect to the motor.

\* \* \* \* \*